United States Patent
Tang et al.

(10) Patent No.: US 6,972,930 B1
(45) Date of Patent: Dec. 6, 2005

(54) ESD-PROTECTED SLIDER AND HEAD GIMBAL ASSEMBLY

(75) Inventors: Kathy X. Tang, Fremont, CA (US); Jai N. Subrahmanyam, Santa Clara, CA (US); Rahmat Karimi, Los Gatos, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 271 days.

(21) Appl. No.: 10/377,041

(22) Filed: Feb. 28, 2003

(51) Int. Cl.[7] ............................ G11B 21/20; G11B 5/33
(52) U.S. Cl. .................................. 360/234.5; 360/323
(58) Field of Search ........................ 360/234.5, 234.4, 360/234.3, 234, 230, 323, 313, 110, 264.2

(56) References Cited

U.S. PATENT DOCUMENTS

| | | | |
|---|---|---|---|
| 5,491,605 A | * | 2/1996 | Hughbanks et al. ......... 360/323 |
| 5,559,051 A | * | 9/1996 | Voldman et al. ............... 438/3 |
| 5,757,591 A | * | 5/1998 | Carr et al. .................... 360/323 |
| 6,400,534 B1 | | 6/2002 | Klaasen ....................... 360/323 |
| 6,424,505 B1 | | 7/2002 | Lam et al. ................... 360/323 |
| 2001/0048573 A1 | * | 12/2001 | Kawai et al. ............ 360/234.5 |
| 2003/0137789 A1 | * | 7/2003 | Walker et al. ................. 361/56 |
| 2003/0174445 A1 | * | 9/2003 | Luo .......................... 360/245.9 |

OTHER PUBLICATIONS

Swenson, D.E., "The effect of resistance to ground on human body ESD", 1999, Electrostatics 1999 Proc. 10th Int. Conf. (Bristol, UK: IP Publishing) p. 351-6.*

* cited by examiner

*Primary Examiner*—Julie Anne Watko
(74) *Attorney, Agent, or Firm*—Joshua C. Harrison, Esq.; Ramin Mobarhan, Esq.

(57) ABSTRACT

A Head Gimbal Assembly (HGA) for use in a disk drive and comprising an ESD-protected slider comprising a head formed on a slider substrate. The slider may comprise an electrical-isolation circuit; an electrically-resistive path between head input connections and the slider; or both isolation circuits and resistive paths for reducing electrostatic charge on the slider while remaining connected during disk drive operations.

51 Claims, 12 Drawing Sheets

ESD-PROTECTED SLIDER AND HEAD GIMBAL ASSEMBLY

FIELD OF THE INVENTON

The present invention relates to a recording head and head gimbal assembly used in disk drives. More particularly, this invention pertains to a recording head and head gimbal assembly having features for improved ESD protection.

BACKGROUND OF THE INVENTON

Disk drives are commonly employed in workstations, personal computers, portables and other computer systems to store large amounts of data in a readily available form. Typically, the primary components of a disk drive are a head disk assembly and a printed circuit board assembly which, when fixed to one another, form a functional unit that is then connected to a computer, such as by insertion into a bay of a host computer.

The head disk assembly includes a base and a cover that collectively house an actuator arrangement, driven by a voice coil motor and comprising a head stack assembly, and at least one data storage disk mounted on a spindle motor for rotating the storage disk. The head stack assembly comprises one or more head gimbal assemblies (HGAs), each comprising a suspension and a head encapsulated in a "slider." The slider has read and write terminals or pads which are connected to pairs of read and write conductors for connecting the head to a preamplifier, usually mounted on the head stack assembly. A presently preferred HGA is formed by mounting a slider on a trace suspension assembly where the conductors are formed in a conductive flexible tape. The resulting assembly may be termed a Trace Gimbal Assembly (TGA).

In present disk drives, head read elements are Giant Magneto-resistive (GMR) elements which are being continually driven to smaller geometries to be compatible with increasing track densities required to meet capacity targets. Unfortunately, the diminishing size of the heads have made them increasingly vulnerable to electrostatic discharges (ESD) during the various stages of the manufacturing process, particularly during the pre-head disk assembly stages. Because of the small physical size of today's heads, very low discharge levels can be more than sufficient to destroy the head.

Additionally, damages caused by ESD events can be hard to detect prior to the final assembly and testing of the disk drive, at which time replacing and repairing of the damaged head proves to be the most expensive and can cause reliability problems due to an overstressed head. It is therefore highly desirable to prevent ESD events from occurring during all stages of the manufacturing of the head stack assembly.

Currently, forms of reducing the occurrence of ESD events include permanent shorting of the head during the manufacturing process of the head, or adjustable shorting of the head, such as by a switched shunt, during selected stages of the manufacturing process. Both these approaches, however, require the removal of the shorting device during or subsequent to the manufacturing of the head stack assembly. The removal process, however, may result in damage to the head, thus diminishing the overall effectiveness of the shorting approach in protecting the head.

Accordingly, what is needed is a slider and a head gimbal assembly that has reduced susceptibility to ESD and EOS events during both the manufacturing and the subsequent operations of the disk drive, without a need for removal of the protection device.

SUMMARY OF THE INVENTION

This invention can be regarded as an ESD-protected slider for use in a disk drive. The ESD-protected slider comprises a head formed on a slider substrate, the head having a first lead and a second lead, a first electrically resistive path connected at one end to the first lead and to the slider substrate at another end; and a second electrically resistive path connected at one end to the second lead and to the slider substrate at another end, wherein the first and second electrically resistive paths are of sufficient resistance to reduce electrostatic charge on the slider and to remain connected during operation of the disk drive.

This invention can also be regarded as an ESD-protected slider for use in a disk drive in which the slider comprises a head formed on a slider substrate, the head having a first head input node and a first head element node and a second head input node and a second head element node. The slider further includes a first electrical-isolation circuit connected at one end to the first head input node and to the first head element node at another end; and a second electrical-isolation circuit connected at one end to the second head input node and to the second head element node at another end, wherein the first and second electrical-isolation circuits reduce a coupling of the electrostatic charge to the head and to remain connected during operation of the disk drive.

This invention can also be regarded as an ESD-protected slider for use in a disk drive in which the slider comprises a head formed on a slider substrate, the head having a first head input node and a first head element node and a second head input node and a second head element node. The slider further includes a first electrical-isolation circuit connected at one end to the first head input node and to the first head element node at another end, a second electrical-isolation circuit connected at one end to the second head input node and to the second head element node at another end, wherein the first and second electrical-isolation circuits reduce a coupling of the electrostatic charge to the head and to remain connected during operation of the disk drive.

The slider also includes a first electrically resistive path connected at one end to the first head input node and to the slider substrate at another end, and a second electrically resistive path connected at one end to the second head input node and to the slider substrate at another end, wherein the first and second electrically resistive paths are of sufficient resistance to reduce electrostatic charge on the slider and to remain connected during operation of the disk drive.

This invention can also be regarded as a Head Gimbal Assembly (HGA) for use in a disk drive. The HGA comprises an a) ESD-protected slider comprising a head formed on a slider substrate, the head having a first lead and a second lead, a first electrically resistive path connected at one end to the first lead and to the slider substrate at another end, and a second electrically resistive path connected at one end to the second lead and to the slider substrate at another end, wherein the first and second electrically resistive paths are of sufficient resistance to reduce electrostatic charge on the slider and to remain connected during operation of the disk drive. The HGA further includes b) a suspension for supporting the head during disk drive operation, and c) a conductor array for connecting the head to a signal processing circuit.

This invention can also be regarded as a Head Gimbal Assembly (HGA) for use in a disk drive in which the HGA comprises a) an ESD-protected slider comprising a head formed on a slider substrate, the head having a first head input node and a first head element node and a second head input node and a second head element node; a first electrical-isolation circuit connected at one end to the first head input node and to the first head element node at another end; and a second electrical-isolation circuit connected at one end to the second head input node and to the second head element node at another end, wherein the first and second electrical-isolation circuits reduce a coupling of the electrostatic charge to the head and to remain connected during operation of the disk drive. The HGA further includes b) a suspension for supporting the head during disk drive operation, and c) a conductor array for connecting the head to a signal processing circuit.

This invention can also be regarded as a Head Gimbal Assembly (HGA) for use in a disk drive in which the HGA comprises a) a head formed on a slider substrate, the head having a first head input node and a first head element node and a second head input node and a second head element node; a first electrical-isolation circuit connected at one end to the first head input node and to the first head element node at another end; a second electrical-isolation circuit connected at one end to the second head input node and to the second head element node at another end, wherein the first and second electrical-isolation circuits reduce a coupling of the electrostatic charge to the head and to remain connected during operation of the disk drive. The slider further includes a first electrically resistive path connected at one end to the first head input node and to the slider substrate at another end, and a second electrically resistive path connected at one end to the second head input node and to the slider substrate at another end, wherein the first and second electrically resistive paths are of sufficient resistance to reduce electrostatic charge on the slider and to remain connected during operation of the disk drive. The HGA further includes b) a suspension for supporting the head during disk drive operation, and c) a conductor array for connecting the head to a signal processing circuit.

DETAILED DESCRIPTION OF THE INVENTION

Figure 1:
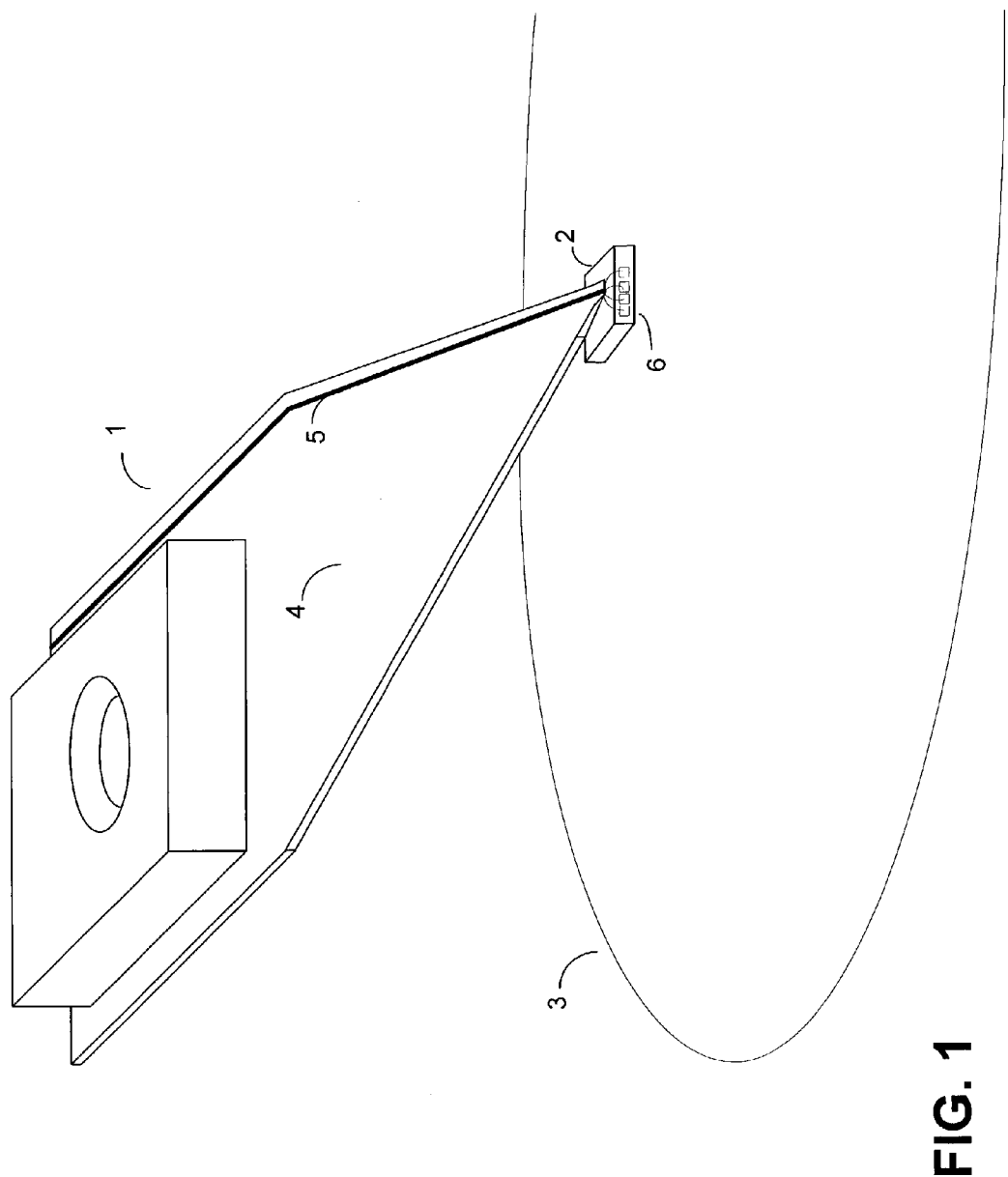
FIG. 1 is a perspective view of a Head Gimbal Assembly having an ESD-protected slider for reducing electrostatic charge effects on the head.

With reference to FIG. 1, a perspective view of a Head Gimbal Assembly (HGA) 1, for use in a disk drive, is shown. The HGA 1 includes an ESD-protected slider 2, described in detail in conjunction with FIGS. 2–7B, for accessing disk 3 via the head 6 formed on the slider 2. The HGA 1 further includes a suspension 4 for supporting the head 6 during disk drive operation, and a conductor array 5 for connecting the head 6 to a signal processing circuit (not shown).

Figure 2:
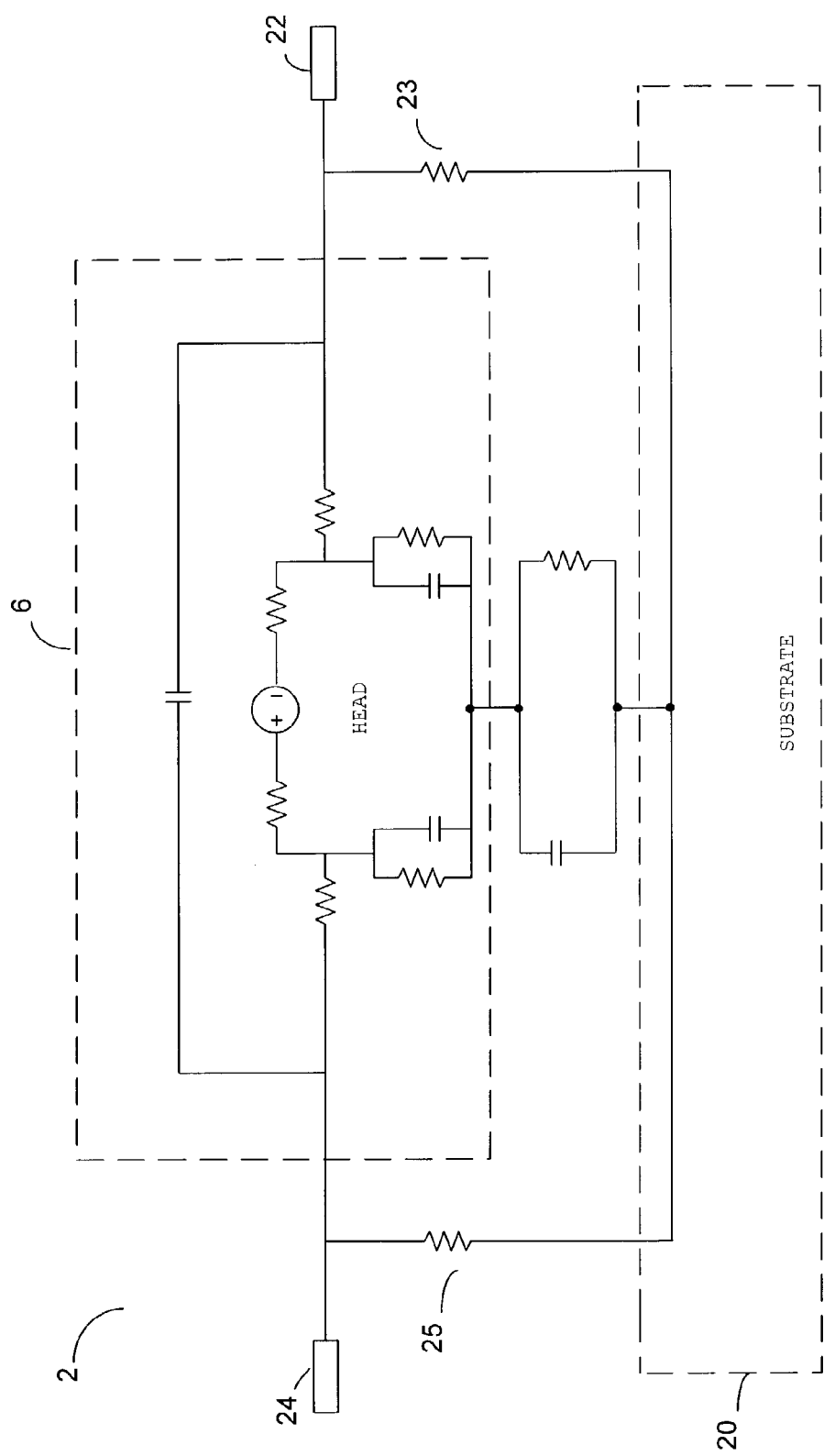
FIGS. 2–4B are combination circuit diagram and cross-sectional views of various embodiments of an ESD-protected slider in accordance with the invention.

With reference to FIG. 2, a combination circuit diagram and cross-sectional view is shown of an embodiment of the ESD-protected slider 2 of the invention. As shown, the slider 2 includes a head 6 formed on a slider substrate 20, the head 6 having a first lead 22 and a second lead 24. The illustrated electrical components and functioning of the head 6 are well known in the art and are therefore not discussed herein. The slider 2 further includes a first electrically resistive path 23 connected at one end to the first lead 22 and to the slider substrate 20 at another end. A second electrically resistive path 25 is connected at one end to the second lead 24 and to the slider substrate 20 at another end. In an embodiment, the first and second electrically resistive paths 23 and 25 are of sufficient resistance to reduce electrostatic charge on the slider 2 and to remain connected during operation of the disk drive. The slider substrate 20 may be a composite material, such as titanium carbide or an aluminum compound.

Preferably, the first resistive path 23 is characterized by a resistance in the range of 2 kilo-ohms to 100 kilo-ohms, and formed from one or more resistors placed in series and/or parallel formation to achieve the preferred range of resistance of 2 kilo-ohms to 100 kilo-ohms. In another embodiment, the first resistive path 23 is characterized by a resistance in the range of 5 kilo-ohms to 50 kilo-ohms, and formed from one or more resistors placed in series and/or parallel formation to achieve the preferred range of resistance of 5 kilo-ohms to 50 kilo-ohms. In an embodiment, the first resistive path 23 can be external to the slider substrate 20 (as shown) or formed integrally on the slider substrate 20 (not shown).

In an embodiment, the second resistive path 25 is characterized by a resistance in the range of 2 kilo-ohms to 100 kilo-ohms, and formed from one or more resistors placed in series and/or parallel formation to achieve the preferred range of resistance of 2 kilo-ohms to 100 kilo-ohms. In another embodiment, the second resistive path 25 is characterized by a resistance in the range of 5 kilo-ohms to 50 kilo-ohms, and formed from one or more resistors placed in series and/or parallel formation to achieve the preferred range of resistance of 5 kilo-ohms to 50 kilo-ohms. In an embodiment, the second resistive path 25 can be external to the slider substrate 20 (as shown) or formed integrally on the slider substrate 20 (not shown).

Figure 3A:
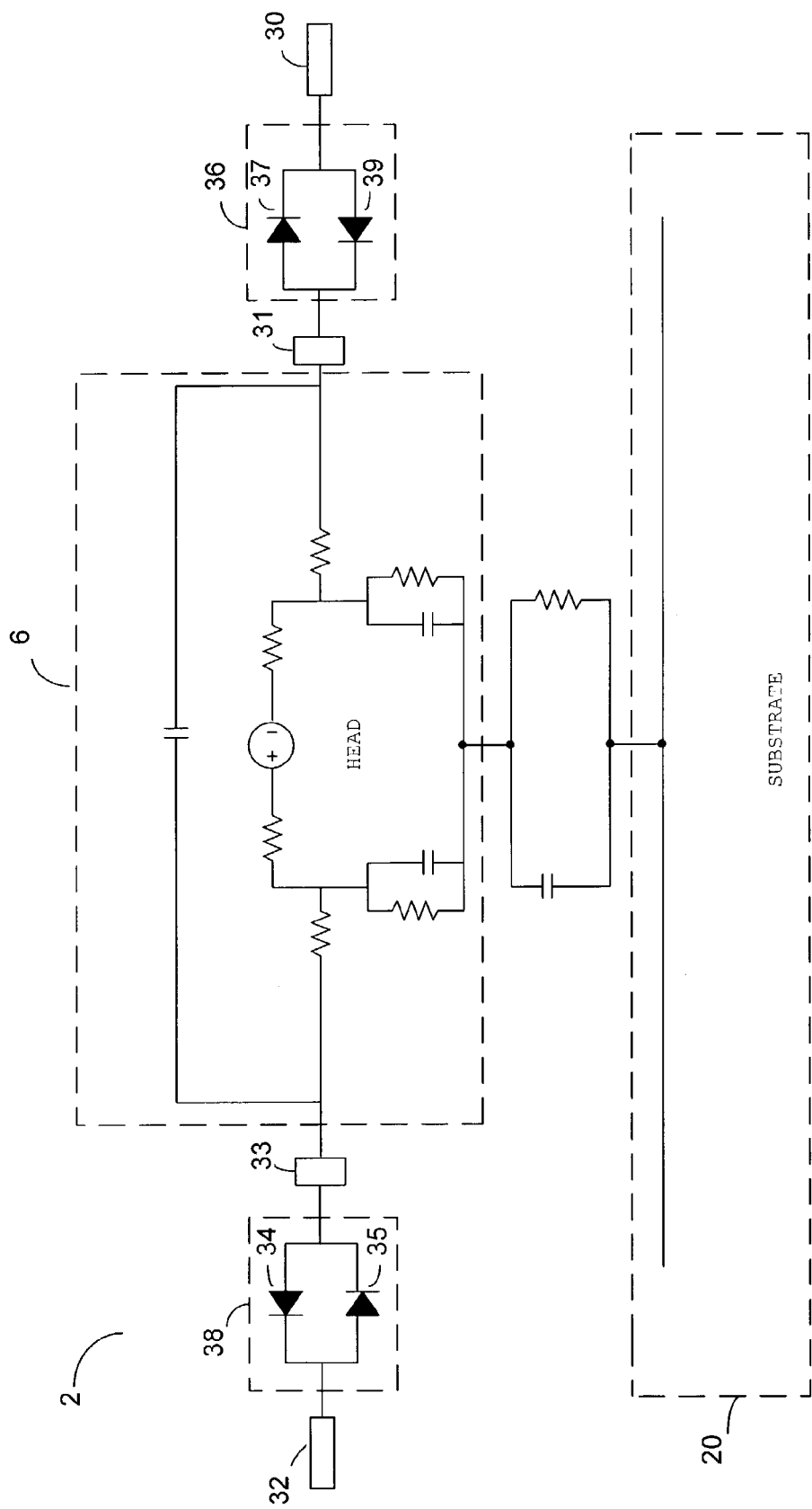

With reference to FIG. 3A, a combination circuit diagram and cross-sectional view is shown of another embodiment of the ESD-protected slider 2 of the invention. As shown, the slider 2 includes a head 6 formed on a slider substrate 20, the head 6 having a first head input node 30 and a first head element node 31 and a second head input node 32 and a second head element node 33. The illustrated electrical components and functioning of the head 6 are well known in the art and are therefore not discussed herein. The slider 2 further includes a first electrical-isolation circuit 36 connected at one end to the first head input node 30 and to the first head element node 31 at another end; and a second electrical-isolation circuit 38 connected at one end to the second head input node 32 and to the second head element node 33 at another end. In an embodiment, the first and second electrical-isolation circuits 36 and 38 reduce a coupling of the electrostatic charge to the head 6 and remain connected during operation of the disk drive. Suitably, the slider substrate 20 is a composite material, such as titanium carbide or an aluminum compound.

Suitably, the first electrical-isolation circuit 36 is an array of diodes, such as diodes 37 and 39, configured to protect the head 6 from electrostatic discharge or electrical overstress events. In an embodiment as shown in FIG. 3A, the diodes 37 and 39 are placed in parallel formation and configured to allow current flows of opposite direction to one another. In an embodiment, the array of diodes comprises at least one reverse-biased diode.

Figure 3B:
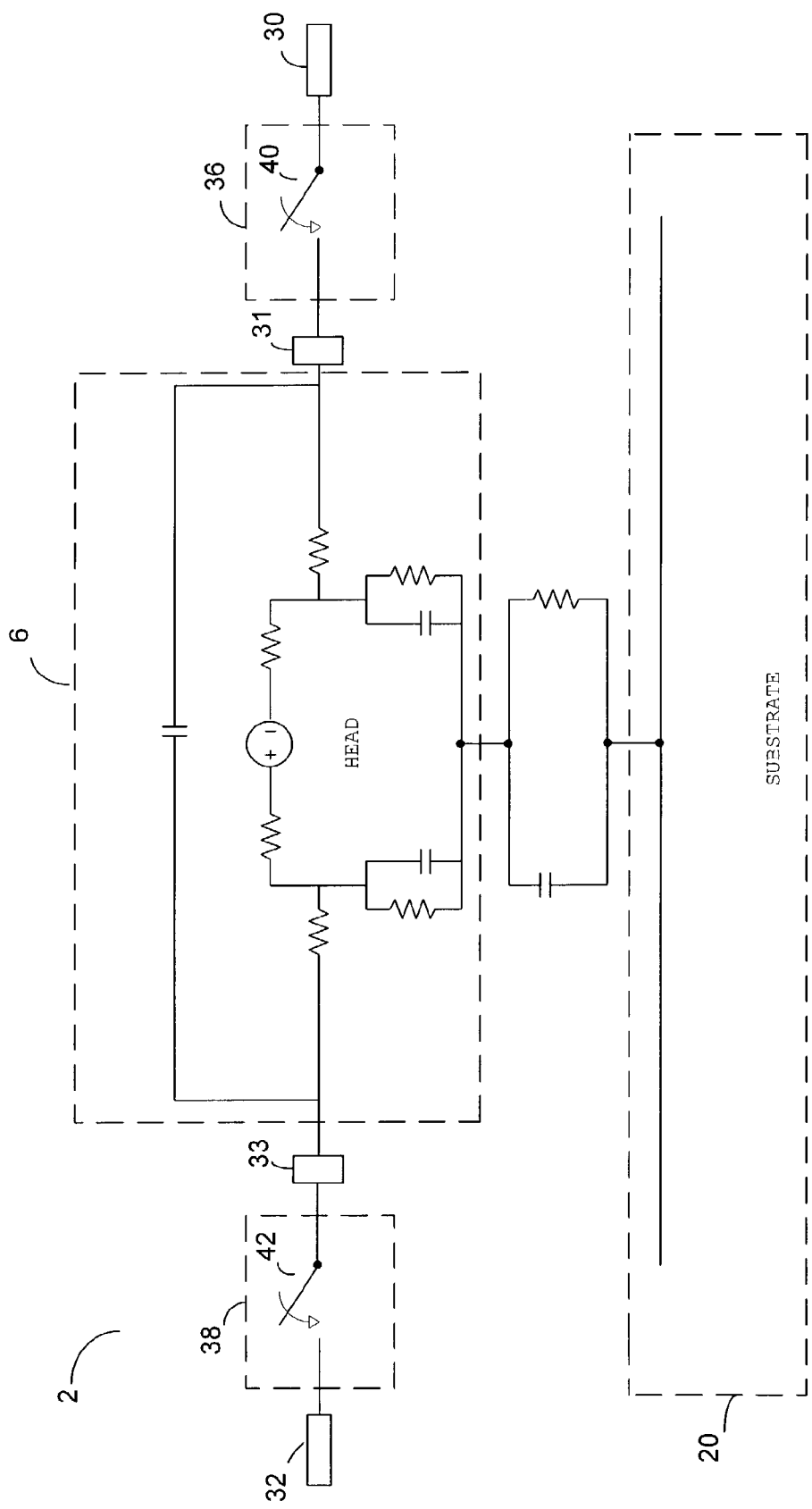

In another embodiment, as shown in FIG. 3B, the first electrical-isolation circuit 36 is one or more electrical switches 40 configured to protect the head 6 from electrostatic discharge or electrical overstress events. In one embodiment, the switch 40 may comprise a transistor configured to protect the head from electrostatic discharge or electrical overstress events.

In one embodiment, the second electrical-isolation circuit 38 is an array of diodes, such as diodes 34 and 35, configured to protect the head 6 from electrostatic discharge or electrical overstress events. In an embodiment shown in FIG. 3A, the diodes 34 and 35 are placed in parallel formation and configured to allow current flows of opposite direction to one another. In one embodiment, the array of diodes comprises at least one reverse-biased diode.

In another embodiment, as shown in FIG. 3B, the second electrical-isolation circuit 38 is one or more electrical switches 42 configured to protect the head 6 from electrostatic discharge or electrical overstress events. In one embodiment the switch 42 may comprise a transistor configured to protect the head from electrostatic discharge or electrical overstress events.

Figure 4A:
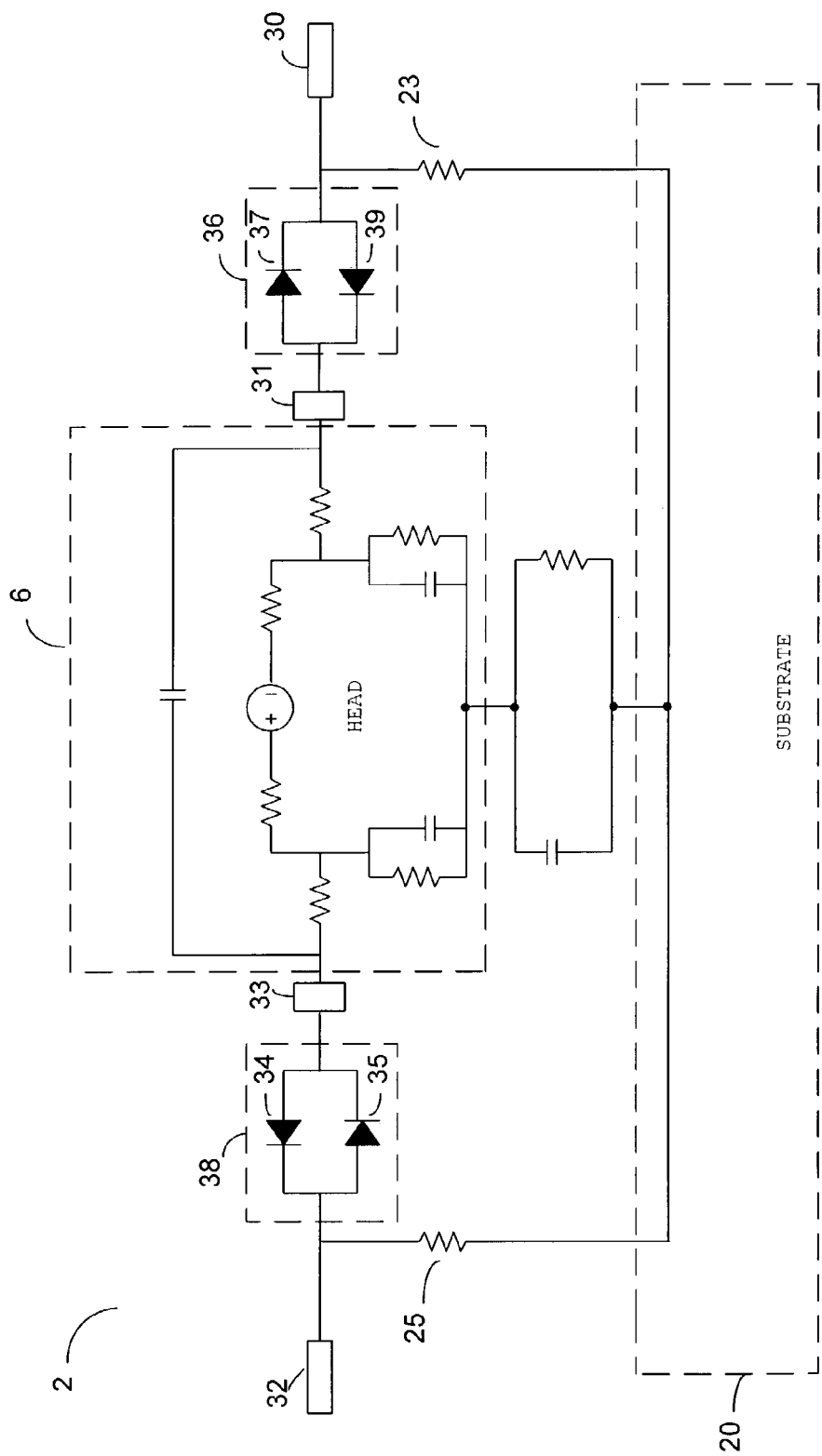

With reference to FIG. 4A, a combination circuit diagram and cross-sectional view is shown of another embodiment of the ESD-protected slider 2 of the invention. As shown, the slider 2 includes a head 6 formed on a slider substrate 20, the head 6 having a first head input node 30 and a first head element node 31 and a second head input node 32 and a second head element node 33. The illustrated electrical components and functioning of the head 6 are well known in the art and are therefore not discussed herein. The slider 2 further includes a first electrical-isolation circuit 36 connected at one end to the first head input node 30 and to the first head element node 31 at another end; and a second electrical-isolation circuit 38 connected at one end to the second head input node 32 and to the second head element node 33 at another end. Suitably, the first and second electrical-isolation circuits 36 and 38 reduce a coupling of the electrostatic charge to the head 6 and remain connected during operation of the disk drive.

The slider 2 further includes a first electrically resistive path 23 connected at one end to the first head input node 30 and to the slider substrate 20 at another end. A second electrically resistive path 25 is connected at one end to the second head input node and to the slider substrate 20 at another end. In an embodiment, the first and second electrically resistive paths 23 and 25 are of sufficient resistance to reduce electrostatic charge on the slider 2 and to remain connected during operation of the disk drive. Suitably, the slider substrate 20 is a composite material, such as titanium carbide or an aluminum compound.

In one embodiment, the first electrical-isolation circuit 36 is an array of diodes, such as diodes 37 and 39, configured to protect the head 6 from electrostatic discharge or electrical overstress events. In an embodiment shown in FIG. 4A, the diodes 37 and 39 are placed in parallel formation and configured to allow current flows of opposite direction to one another. Suitably, the array of diodes comprises at least one reverse-biased diode.

Figure 4B:
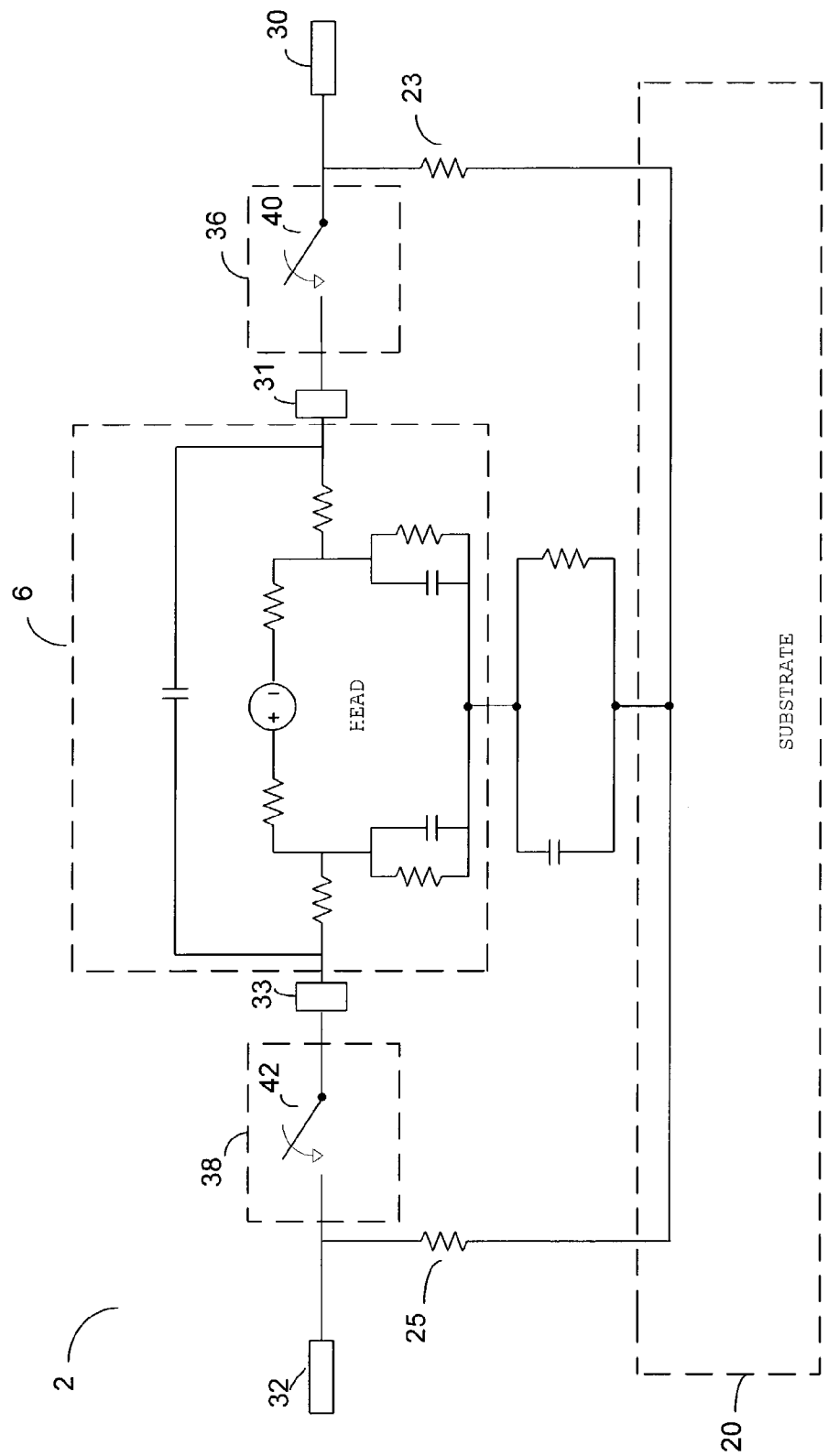

In another embodiment, as shown in FIG. 4B, the first electrical-isolation circuit 36 is one or more electrical switches 40 configured to protect the head 6 from electrostatic discharge or electrical overstress events. In an embodiment, the switch 40 is a transistor configured to protect the head 6 from electrostatic discharge or electrical overstress events.

In an embodiment, the second electrical-isolation circuit 38 is an array of diodes, such as diodes 34 and 35, configured to protect the head 6 from electrostatic discharge or electrical overstress events. In an embodiment shown in FIG. 4A, the diodes 34 and 35 are placed in parallel formation and configured to allow current flows of opposite direction to one another. Suitably, the array of diodes comprises at least one reverse-biased diode.

In another embodiment, as shown in FIG. 4B, the second electrical-isolation circuit 38 comprises one or more electrical switches 42 configured to protect the head 6 from electrostatic discharge or electrical overstress events. In an embodiment, the switch 42 may be a transistor configured to protect the head 6 from electrostatic discharge or electrical overstress events.

Suitably, the first resistive path 23 is characterized by a resistance in the range of 2 kilo-ohms to 100 kilo-ohms, and formed from one or more resistors placed in series and/or parallel formation to achieve the preferred range of resistance of 2 kilo-ohms to 100 kilo-ohms. In another embodiment, the first resistive path 23 is characterized by a resistance in the range of 5 kilo-ohms to 50 kilo-ohms, and formed from one or more resistors placed in series and/or parallel formation to achieve the preferred range of resistance of 5 kilo-ohms to 50 kilo-ohms. The first resistive path 23 can be external to the slider substrate 20 (as shown) or formed integrally on the slider substrate 20 (not shown).

Suitably, the second resistive path 25 is characterized by a resistance in the range of 2 kilo-ohms to 100 kilo-ohms, and formed from one or more resistors placed in series and/or parallel formation to achieve the preferred range of resistance of 2 kilo-ohms to 100 kilo-ohms. In another embodiment, the second resistive path 25 is characterized by a resistance in the range of 5 kilo-ohms to 50 kilo-ohms, and formed from one or more resistors placed in series and/or parallel formation to achieve the range of resistance of 5 kilo-ohms to 50 kilo-ohms. Suitably, the second resistive path 25 can be external to the slider substrate 20 (as shown) or formed integrally on the slider substrate 20 (not shown).

Figure 5A:
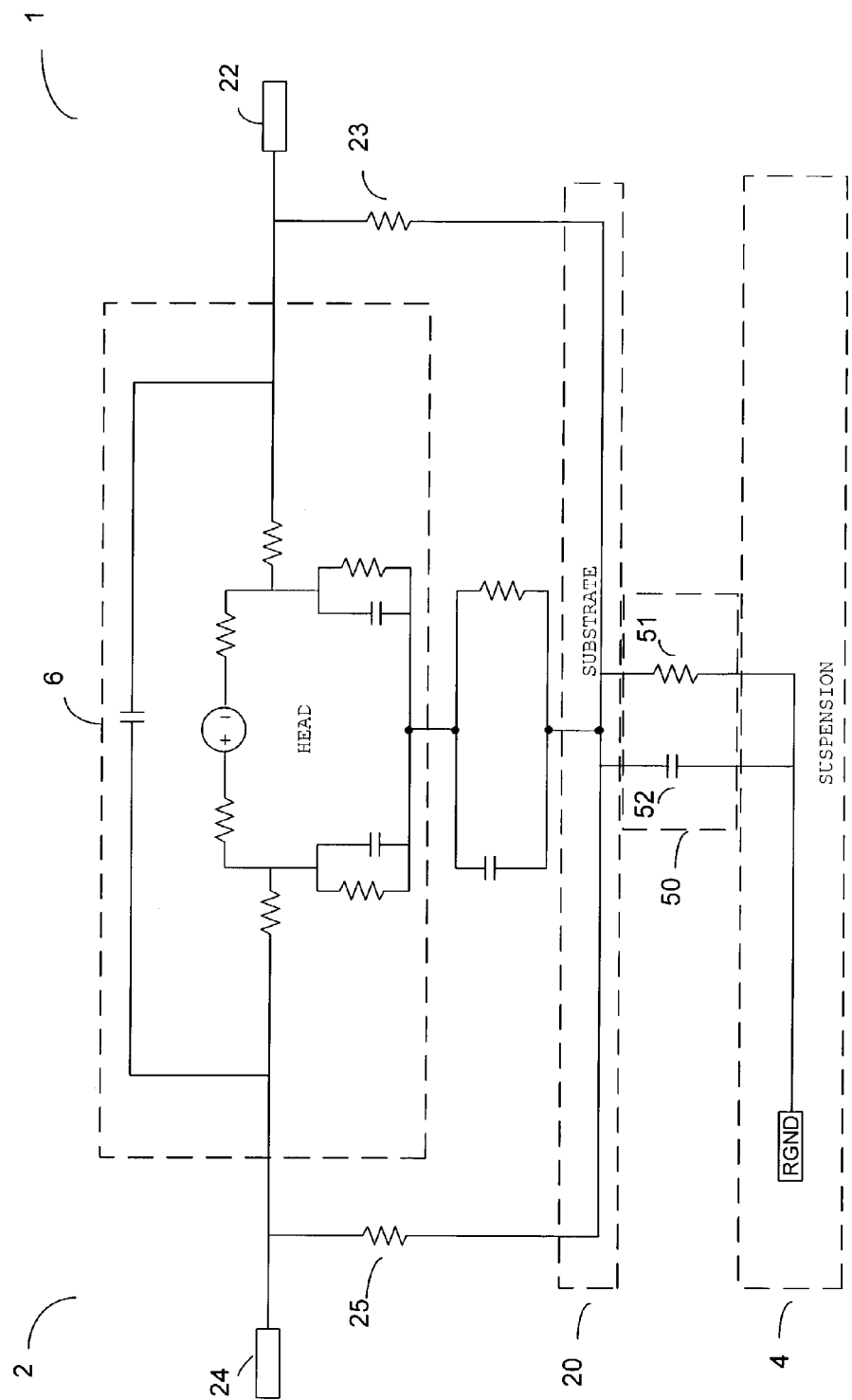
FIGS. 5A–7B are combination circuit diagram and cross-sectional views of various embodiments of a Head Gimbal Assembly having an ESD-protected slider in accordance with the invention.

With reference to FIG. 5A, a combination circuit diagram and cross-sectional view is shown of an embodiment of the HGA 1 having an ESD-protected slider 2 in accordance with the invention. As shown, the HGA 1 includes a slider 2 having a head 6 formed on a slider substrate 20, the head 6 having a first lead 22 and a second lead 24. The illustrated electrical components and functioning of the head 6 are well known in the art and are therefore not discussed herein. The slider 2 further includes a first electrically resistive path 23 connected at one end to the first lead 22 and to the slider substrate 20 at another end. A second electrically resistive path 25 is connected at one end to the second lead 24 and to the slider substrate 20 at another end. Preferably, the first and second electrically resistive paths 23 and 25 are of sufficient resistance to reduce electrostatic charge on the slider 2 and to remain connected during operation of the disk drive. The HGA 1 further includes a suspension 4 for supporting the head 6 during disk drive operation; and a conductor array 5 (as shown in FIG. 1) for connecting the head 6 to a signal processing circuit (not shown). Suitably, the slider substrate 20 is a composite material, such as titanium carbide or an aluminum compound.

In the embodiment shown in FIG. 5A, the slider 2 is conductively coupled to the suspension 4 via a conductive adhesive 50 applied between the slider substrate 20 and the suspension 4. The slider 2 is therefore in effect grounded to the suspension 4. The conductive adhesive 50 typically exhibits electrical properties of a resistor-capacitor (RC) circuit as shown by resistor 51 and capacitor 52. In one embodiment, the conductive adhesive 50 is an Epoxy.

Figure 5B:
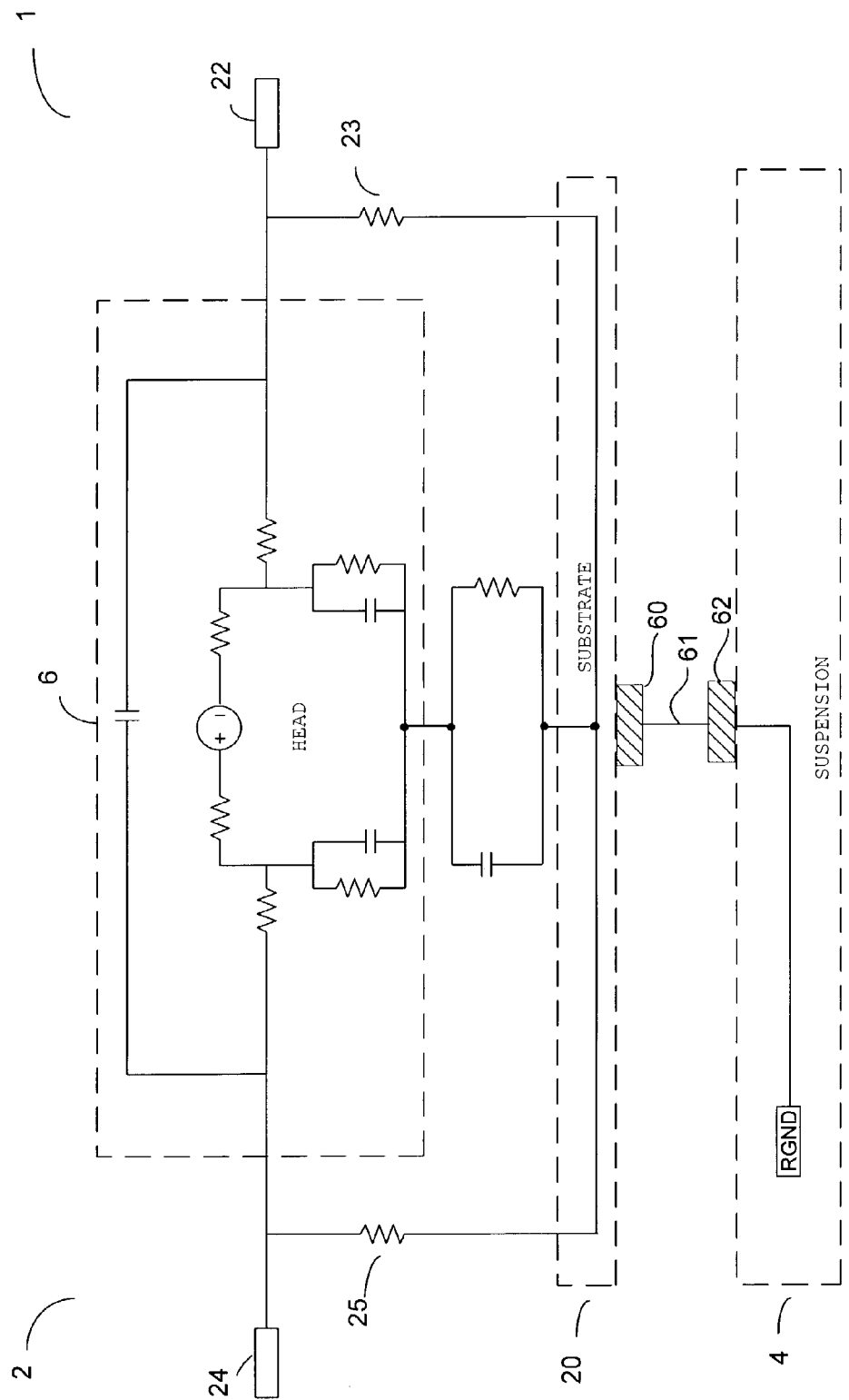

In another embodiment shown in FIG. 5B, the slider 2 is conductively coupled to the suspension 4 via a substrate pad 60 conductively connected to the slider substrate 20, a suspension pad 62 conductively connected to the suspension 4, and a conductive path 62, such as a wire, connected at one end to the substrate pad 60 and to the suspension pad 62 at another end.

In one embodiment, the first resistive path 23 is characterized by a resistance in the range of 2 kilo-ohms to 100 kilo-ohms, and formed from one or more resistors placed in series and/or parallel formation to achieve the range of resistance of 2 kilo-ohms to 100 kilo-ohms. In another embodiment, the first resistive path 23 is characterized by a resistance in the range of 5 kilo-ohms to 50 kilo-ohms, and formed from one or more resistors placed in series and/or parallel formation to achieve the preferred range of resistance of 5 kilo-ohms to 50 kilo-ohms. The first resistive path 23 can be external to the slider substrate 20 (as shown) or formed integrally on the slider substrate 20 (not shown).

In an embodiment, the second resistive path 25 is characterized by a resistance in the range of 2 kilo-ohms to 100 kilo-ohms, and formed from one or more resistors placed in series and/or parallel formation to achieve the preferred range of resistance of 2 kilo-ohms to 100 kilo-ohms. In another embodiment, the second resistive path 25 is characterized by a resistance in the range of 5 kilo-ohms to 50 kilo-ohms, and formed from one or more resistors placed in series and/or parallel formation to achieve the range of resistance of 5 kilo-ohms to 50 kilo-ohms. The second resistive path 25 can be external to the slider substrate 20 (as shown) or formed integrally on the slider substrate 20 (not shown).

Figure 6A:
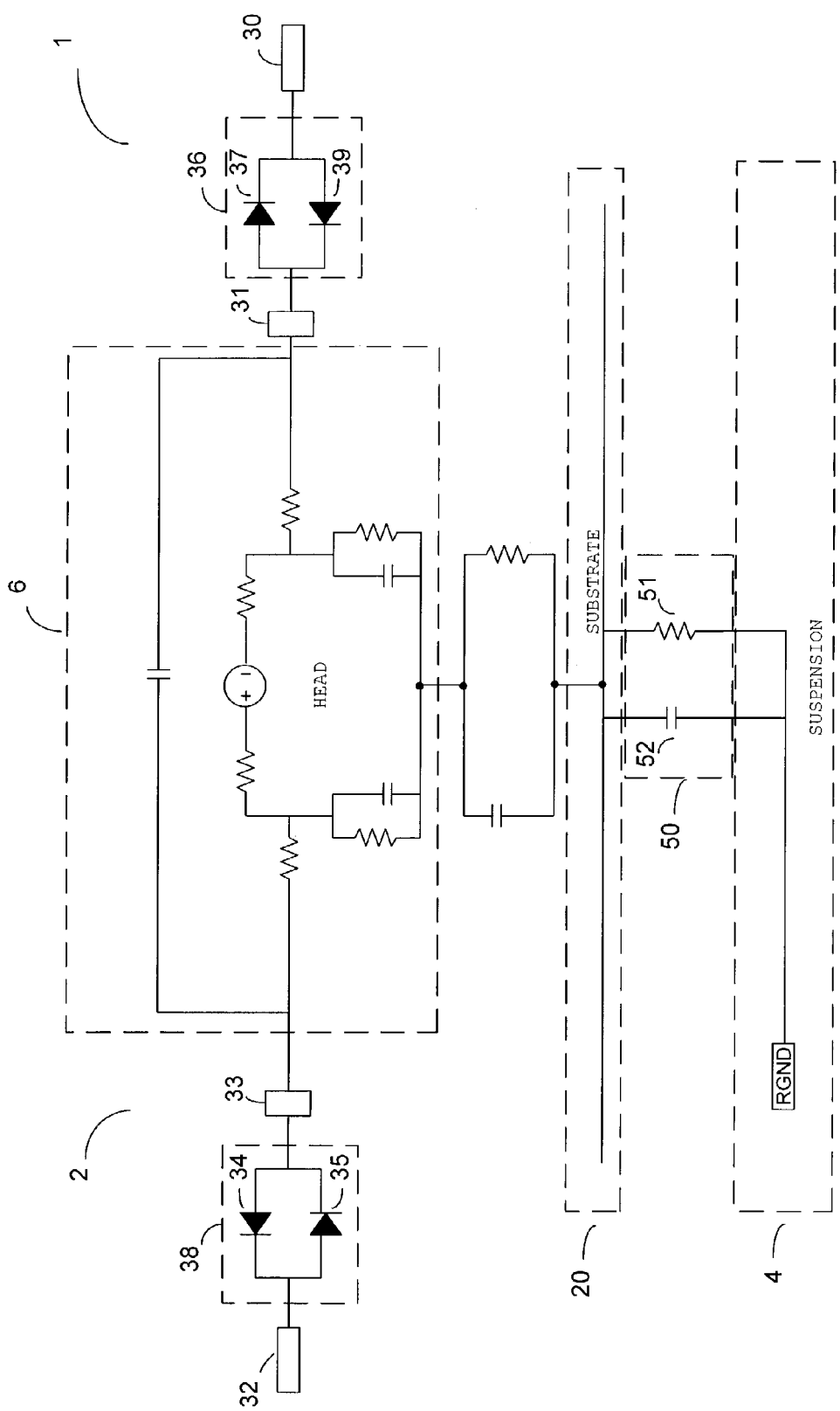

With reference to FIG. 6A, a combination circuit diagram and cross-sectional view is shown of another embodiment of the HGA 1 having an ESD-protected slider 2 in accordance with the invention. As shown, the HGA 1 includes a slider 2 having a head 6 formed on a slider substrate 20, the head 6 having a first head input node 30 and a first head element node 31, and a second head input node 32 and a second head element node 33. The illustrated electrical components and functioning of the head 6 are well known in the art and are therefore not discussed herein. The slider 2 further includes a first electrical-isolation circuit 36 connected at one end to the first head input node 30 and to the first head element node 31 at another end; and a second electrical-isolation circuit 38 connected at one end to the second head input node 32 and to the second head element node 33 at another end. Suitably, the first and second electrical-isolation circuits 36 and 38 reduce a coupling of the electrostatic charge to the head 6 and remain connected during operation of the disk drive. The HGA 1 further includes a suspension 4 for supporting the head 6 during disk drive operation; and a conductor array 5 (as shown in FIG. 1) for connecting the head 6 to a signal processing circuit (not shown). In one embodiment, the slider substrate 20 is a composite material, such as titanium carbide or an aluminum compound.

In an embodiment as shown in FIG. 6A, the slider 2 is conductively coupled to the suspension 4 via a conductive adhesive 50 applied between the slider substrate 20 and the suspension 4. The slider 2 is therefore in effect grounded to the suspension 4. The conductive adhesive 50 typically exhibits electrical properties of a resistor-capacitor (RC) circuit as shown by resistor 51 and capacitor 52. In one embodiment, conductive adhesive 50 is an Epoxy. In another embodiment, the slider 2 is conductively coupled to the suspension 4 in the manner described in conjunction with FIG. 5B.

In one embodiment, the first electrical-isolation circuit 36 is an array of diodes, such as diodes 37 and 39, configured to protect the head 6 from electrostatic discharge or electrical overstress events. In an embodiment shown in FIG. 6A, the diodes 37 and 39 are placed in parallel formation and configured to allow current flows of opposite direction to one another. Suitably, the array of diodes comprises at least one reverse-biased diode.

Figure 6B:
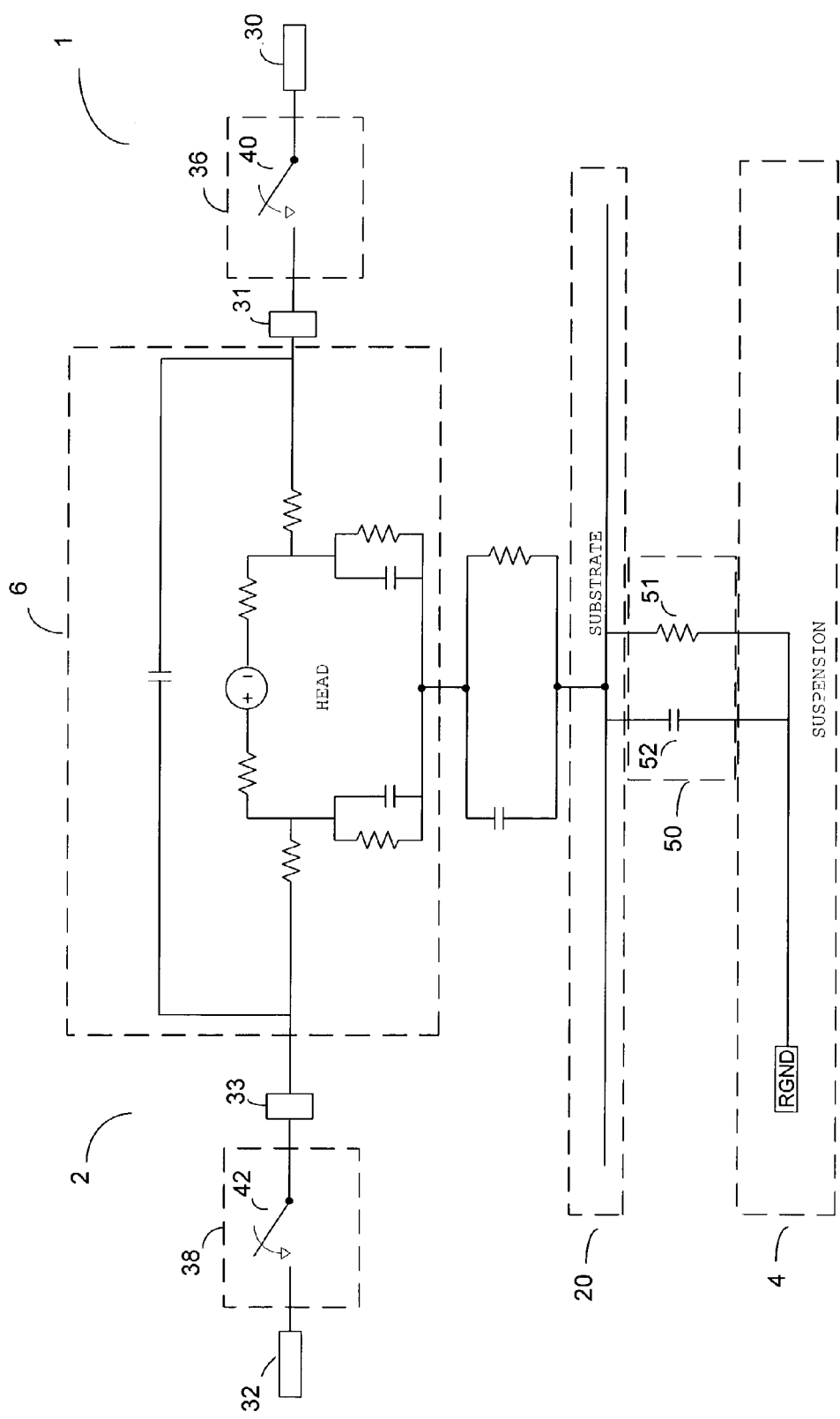

In another embodiment, as shown in FIG. 6B, the first electrical-isolation circuit 36 is one or more electrical switches 40 configured to protect the head 6 from electrostatic discharge or electrical overstress events. In an embodiment, the switch 40 is a transistor configured to protect the head 6 from electrostatic discharge or electrical overstress events.

In an embodiment, the second electrical-isolation circuit 38 is an array of diodes, such as diodes 34 and 35, configured to protect the head 6 from electrostatic discharge or electrical overstress events. In the embodiment shown in FIG. 6A, the diodes 34 and 35 are placed in parallel formation and configured to allow current flows of opposite direction to one another. Suitably, the array of diodes comprises at least one reverse-biased diode.

In another embodiment, as shown in FIG. 6B, the second electrical-isolation circuit 38 is one or more electrical switches 42 configured to protect the head 6 from electrostatic discharge or electrical overstress events. In an embodiment, the switch 42 is a transistor configured to protect the head 6 from electrostatic discharge or electrical overstress events.

One advantage of the foregoing feature of the present invention over the prior art is that the electrical-isolation circuits 36 and 38 reduce the occurrence of electrostatic charge coupling to the head 6 by isolating the head 6 from the ground, while the conductive coupling of conductive adhesive 50 provides a different discharge path to the ground in suspension 4.

Figure 7A:
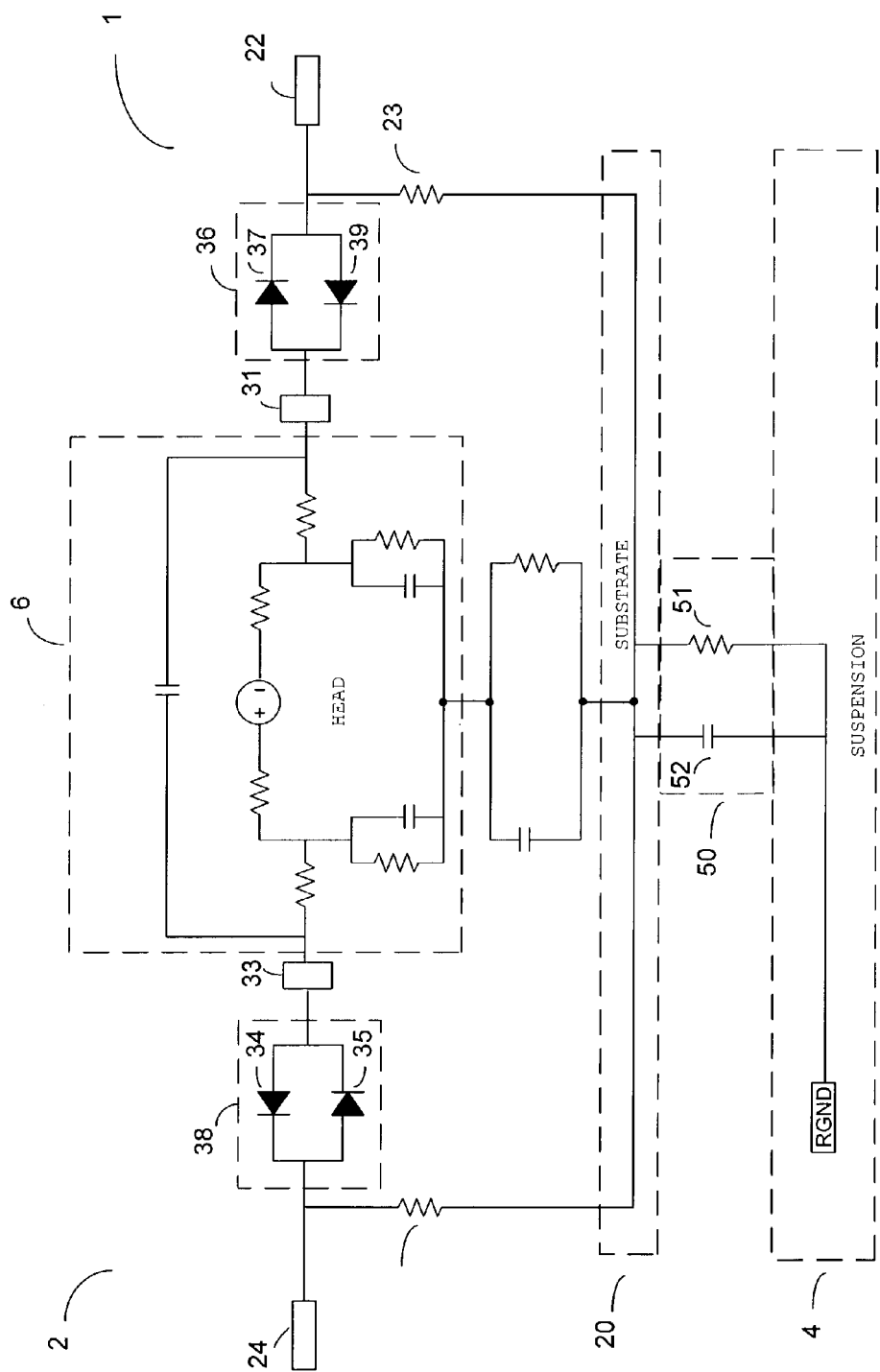

With reference to FIG. 7A, a combination circuit diagram and cross-sectional view is shown of yet another embodiment of the HGA 1 having an ESD-protected slider 2 in accordance with the invention. As shown, the HGA 1 includes a slider 2 having a head 6 formed on a slider substrate 20, the head 6 having a first head input node 30 and a first head element node 31, and a second head input node 32 and a second head element node 33. The illustrated electrical components and functioning of the head 6 are well known in the art and are therefore not discussed herein. The slider 2 further includes a first electrical-isolation circuit 36 connected at one end to the first head input node 30 and to the first head element node 31 at another end; and a second electrical-isolation circuit 38 connected at one end to the second head input node 32 and to the second head element node 33 at another end. Suitably, the first and second electrical-isolation circuits 36 and 38 reduce a coupling of the electrostatic charge to the head 6 and remain connected during operation of the disk drive.

The slider 2 further includes a first electrically resistive path 23 connected at one end to the first head input node 30 and to the slider substrate 20 at another end. A second electrically resistive path 25 is connected at one end to the second head input node and to the slider substrate 20 at another end. In a preferred embodiment, the first and second electrically resistive paths 23 and 25 are of sufficient resistance to reduce electrostatic charge on the slider 2 and to remain connected during operation of the disk drive. Suitably, the slider substrate 20 is a composite material, such as titanium carbide or an aluminum compound. The HGA 1 further includes a suspension 4 for supporting the head 6 during disk drive operation; and a conductor array 5 (as shown in FIG. 1) for connecting the head 6 to a signal processing circuit (not shown).

In an embodiment as shown in FIG. 7A, the slider 2 is resistively coupled to the suspension 4 via a conductive adhesive 50 applied between the slider substrate 20 and the suspension 4. The slider 2 is therefore in effect grounded to the suspension 4. The conductive adhesive 50 typically exhibits electrical properties of a resistor-capacitor (RC) circuit as shown by resistor 51 and capacitor 52. In one embodiment, conductive adhesive 50 is an Epoxy. In another embodiment, the slider 2 is conductively coupled to the suspension 4 in the manner described in conjunction with FIG. 5B.

In one embodiment, the first electrical-isolation circuit 36 is an array of diodes, such as diodes 37 and 39, configured to protect the head 6 from electrostatic discharge or electrical overstress events. In an embodiment shown in FIG. 7A, the diodes 37 and 39 are placed in parallel formation and configured to allow current flows of opposite direction to one another. Suitably, the array of diodes comprises at least one reverse-biased diode.

Figure 7B:
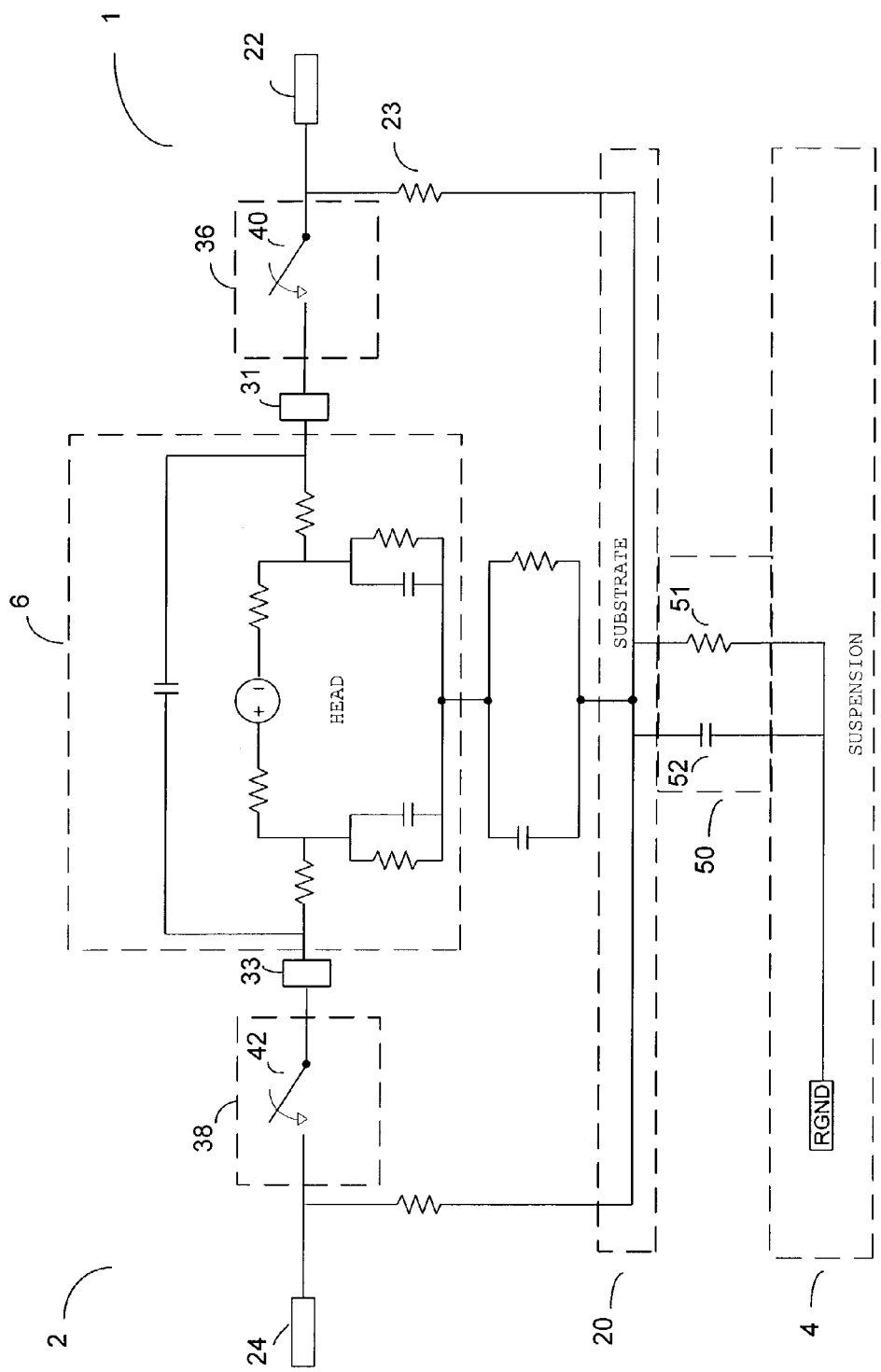

In another embodiment, as shown in FIG. 7B, the first electrical-isolation circuit 36 is one or more electrical switches 40 configured to protect the head 6 from electrostatic discharge or electrical overstress events. In an embodiment, the switch 40 is a transistor configured to protect the head 6 from electrostatic discharge or electrical overstress events.

In an embodiment, the second electrical-isolation circuit 38 is an array of diodes, such as diodes 34 and 35, configured to protect the head 6 from electrostatic discharge or electrical overstress events. In the embodiment shown in FIG. 7A, the diodes 34 and 35 are placed in parallel formation and configured to allow current flows of opposite direction to one another. Suitably, the array of diodes comprises at least one reverse-biased diode.

In another embodiment, as shown in FIG. 7B, the second electrical-isolation circuit 38 is one or more electrical switches 42 configured to protect the head 6 from electrostatic discharge or electrical overstress events. In an embodiment, the switch 42 is a transistor configured to protect the head 6 from electrostatic discharge or electrical overstress events.

In one embodiment, the first resistive path 23 is characterized by a resistance in the range of 2 kilo-ohms to 100 kilo-ohms, and formed from one or more resistors placed in series and/or parallel formation to achieve the preferred range of resistance of 2 kilo-ohms to 100 kilo-ohms. In another embodiment, the first resistive path 23 is characterized by a resistance in the range of 5 kilo-ohms to 50 kilo-ohms, and formed from one or more resistors placed in series and/or parallel formation to achieve the preferred range of resistance of 5 kilo-ohms to 50 kilo-ohms. The first resistive path 23 can be external to the slider substrate 20 (as shown) or formed integrally on the slider substrate 20 (not shown).

In an embodiment, the second resistive path 25 is characterized by a resistance in the range of 2 kilo-ohms to 100 kilo-ohms, and formed from one or more resistors placed in series and/or parallel formation to achieve the preferred range of resistance of 2 kilo-ohms to 100 kilo-ohms. In another embodiment, the second resistive path 25 is characterized by a resistance in the range of 5 kilo-ohms to 50 kilo-ohms, and formed from one or more resistors placed in series and/or parallel formation to achieve the range of resistance of 5 kilo-ohms to 50 kilo-ohms. The second resistive path 25 can be external to the slider substrate 20 (as shown) or formed integrally on the slider substrate 20 (not shown).

One advantage of the foregoing feature of the present invention over the prior art is that the electrical-isolation circuits 36 and 38 reduce the occurrence of electrostatic charge coupling to the head 6 by isolating the head 6 from the ground, while the conductive coupling of conductive adhesive 50 and the resistive paths 23 and 25 provide different discharge paths to the ground in suspension 4.

It should be noted that the various features of the foregoing embodiments were discussed separately for clarity of description only and they can be incorporated in whole or in part into a single embodiment of the invention having all or some of these features.

What is claimed is:

1. A ESD-protected slider for use in a disk drive, comprising:
   a head formed on a slider substrate, the head having a first lead and a second lead;
   a first electrically resistive path connected at one end to the first lead and to the slider substrate at another end; and
   a second electrically resistive path connected at one end to the second lead and to the slider substrate at another end,
   wherein the first and second electrically resistive paths are of sufficient resistance to reduce electrostatic charge on the slider and to remain connected during operation of the disk drive.

2. The slider as claimed in claim 1, wherein each of the first and second resistive paths is characterized by a resistance in the range of 2 kilo ohms to 100 kilo-ohms.

3. The slider as claimed in claim 1, wherein each of the first and second resistive paths is characterized by a resistance in the range of 5 kilo ohms to 50 kilo-ohms.

4. The slider as claimed in claim 1, wherein each of the first and second resistive paths is formed integrally on the slider substrate.

5. The slider as claimed in claim 1, wherein each of the first and second resistive paths is external to the slider substrate.

6. The slider as claimed in claim 1, wherein the slider substrate is a composite material.

7. The slider as claimed in claim 6, wherein the composite material is a titanium carbide compound.

8. The slider as claimed in claim 6, wherein the composite material is an aluminum compound.

9. The slider as claimed in claim 1, wherein each of the first and second resistive paths comprises a plurality of resistors placed in at least one of a series and parallel formation.

10. A Head Gimbal Assembly (HGA) for use in a disk drive, comprising:
   a) an ESD-protected slider comprising:
      a head formed on a slider substrate, the head having a first lead and a second lead;
      a first electrically resistive path connected at one end to the first lead and to the slider substrate at another end; and a second electrically resistive path connected at one end to the second lead and to the slider substrate at another end;

wherein the first and second electrically resistive paths are of sufficient resistance to reduce electrostatic charge on the slider and to remain connected during operation of the disk drive;

b) a suspension for supporting the head during disk drive operation; and c) a conductor array for connecting the head to a signal processing circuit.

11. The HGA as claimed in claim 10, wherein the slider is conductively coupled to the suspension.

12. The HGA as claimed in claim 11, wherein the slider is conductively coupled to the suspension via a conductive adhesive.

13. The HGA as claimed in claim 12, wherein the conductive adhesive is an Epoxy.

14. The HGA as claimed in claim 11, wherein the slider is conductively coupled to the suspension via a substrate pad conductively connected to the slider substrate, a suspension pad conductively connected to the suspension, and a conductive path connected at one end to the substrate pad and to the suspension pad at another end.

15. The HGA as claimed in claim 10, wherein each of the first and second resistive paths is characterized by a resistance in the range of 2 kilo-ohms to 100 kilo-ohms.

16. The HGA as claimed in claim 10, wherein each of the first and second resistive paths is characterized by a resistance in the range of 5 kilo-ohms to 50 kilo-ohms.

17. The HGA as claimed in claim 10, wherein each of the first and second resistive paths is formed integrally on the slider substrate.

18. The HGA as claimed in claim 10, wherein each of the first and second resistive paths is external to the slider substrate.

19. The HGA as claimed in claim 10, wherein the slider substrate is a composite material.

20. The HGA as claimed in claim 19, wherein the composite material is at least one of a titanium carbide compound and an aluminum compound.

21. The HGA as claimed in claim 10, wherein each of the first and second resistive paths comprises a plurality of resistors placed in at least one of a series and parallel formation.

22. A Head Gimbal Assembly (HGA) for use in a disk drive, comprising:

a) an ESD-protected slider comprising:
a head formed on a slider substrate, the head having a first head input node and a first head element node and a second head input node and a second head element node;
a first electrical-isolation circuit connected at one end to the first head input node and to the first head element node at another end;
a second electrical-isolation circuit connected at one end to the second head input node and to the second head element node at another end, wherein the first and second electrical-isolation circuits reduce a coupling of the electrostatic charge to the head and to remain connected during operation of the disk drive;
a first electrically resistive path connected at one end to the first head input node and to the slider substrate at another end; and
a second electrically resistive path connected at one end to the second head input node and to the slider substrate at another end, wherein the first and second electrically resistive paths are of sufficient resistance to reduce electrostatic charge on the slider and to remain connected during operation of the disk drive;

b) a suspension for supporting the head during disk drive operation; and c) a conductor array for connecting the head to a signal processing circuit.

23. The HGA as claimed in claim 22, wherein each of the first and second electrical-isolation circuits is an array of electrical switches, configured to protect the head from electrostatic discharge or electrical overstress events.

24. The HGA as claimed in claim 23, wherein the array of electrical switches comprises a plurality of transistors configured to protect the head from electrostatic discharge or electrical overstress events.

25. The HGA as claimed in claim 22, wherein each of the first and second electrical-isolation circuits is an array of diodes, configured to protect the head from electrostatic discharge or electrical overstress events.

26. The HGA as claimed in claim 25, wherein the array of diodes comprises a plurality of diodes placed in parallel formation and configured to allow current flows of opposite direction to one another.

27. The HGA as claimed in claim 26, wherein the array of diodes comprises at least one reverse-biased diode.

28. The HGA as claimed in claim 22, wherein the slider is conductively coupled to the suspension.

29. The HGA as claimed in claim 28, wherein the slider is conductively coupled to the suspension via a conductive adhesive.

30. The HGA as claimed in claim 29, wherein the conductive adhesive is an Epoxy.

31. The HGA as claimed in claim 28, wherein the slider is conductively coupled to the suspension via a substrate pad conductively connected to the slider substrate, a suspension pad conductively connected to the suspension, and a conductive path connected at one end to the substrate pad and to the suspension pad at another end.

32. The HGA as claimed in claim 22, wherein each of the first and second resistive paths is characterized by a resistance in the range of 2 kilo-ohms to 100 kilo-ohms.

33. The HGA as claimed in claim 22, wherein each of the first and second resistive paths is characterized by a resistance in the range of 5 kilo-ohms to 50 kilo-ohms.

34. The HGA as claimed in claim 22, wherein each of the first and second resistive paths is formed integrally on the slider substrate.

35. The HGA as claimed in claim 22, wherein each of the first and second resistive paths is external to the slider substrate.

36. The HGA as claimed in claim 22, wherein the slider substrate is a composite material.

37. The HGA as claimed in claim 36, wherein the composite material is at least one of a titanium carbide compound and an aluminum compound.

38. The HGA as claimed in claim 22, wherein each of the first and second resistive paths comprises a plurality of resistors placed in at least one of a series and parallel formation.

39. An ESD-protected slider comprising:
a head formed on a slider substrate, the head having a first head input node and a first head element node, and a second head input node and a second head element node;

a first electrical-isolation circuit connected at one end to the first head input node and to the first head element node at another end;

a second electrical-isolation circuit connected at one end to the second head input node and to the second head element node at another end, wherein the first and second electrical-isolation circuits reduce a coupling of the electrostatic charge to the head and to remain connected during operation of the disk drive;

a first electrically resistive path connected at one end to the first head input node and to the slider substrate at another end; and a second electrically resistive path connected at one end to the second head input node and to the slider substrate at another end, wherein the first and second electrically resistive paths are of sufficient resistance to reduce electrostatic charge on the slider and to remain connected during operation of the disk drive.

40. The slider as claimed in claim 39, wherein each of the first and second resistive paths is characterized by a resistance in the range of 2 kilo-ohms to 100 kilo-ohms.

41. The slider as claimed in claim 39, wherein each of the first and second resistive paths is characterized by a resistance in the range of 5 kilo-ohms to 50 kilo-ohms.

42. The slider as claimed in claim 39, wherein each of the first and second resistive paths is formed integrally on the slider substrate.

43. The slider as claimed in claim 39, wherein each of the first and second resistive paths is external to the slider substrate.

44. The slider as claimed in claim 39, wherein the slider substrate is a composite material.

45. The slider as claimed in claim 44, wherein the composite material is at least one of a titanium carbide compound and aluminum compound.

46. The slider as claimed in claim 39, wherein each of the first and second resistive paths comprises a plurality of resistors placed in at least one of a series and parallel formation.

47. The slider as claimed in claim 39, wherein each of the first and second electrical-isolation circuits is an array of electrical switches configured to protect the head from electrostatic discharge or electrical overstress events.

48. The slider as claimed in claim 47, wherein the array of electrical switches comprises a plurality of transistors configured to protect the head from electrostatic discharge or electrical overstress events.

49. The slider as claimed in claim 39, wherein each of the first and second electrical-isolation circuits is an array of diodes configured to protect the head from electrostatic discharge or electrical overstress events.

50. The slider as claimed in claim 49, wherein the array of diodes comprises a plurality of diodes placed in parallel formation and configured to allow current flows of opposite direction to one another.

51. The slider as claimed in claim 50, wherein the array of diodes comprises at least one reverse-biased diode.

* * * * *